(12) United States Patent
Daggubati

(10) Patent No.: US 11,765,319 B2
(45) Date of Patent: Sep. 19, 2023

(54) SYSTEM FOR SECURED VIDEO CONFERENCING VIA VIRTUAL ROOMS

(71) Applicant: Kishore Daggubati, Danville, CA (US)

(72) Inventor: Kishore Daggubati, Danville, CA (US)

( * ) Notice: Subject to any disclaimer, the term of this patent is extended or adjusted under 35 U.S.C. 154(b) by 47 days.

(21) Appl. No.: 17/577,043

(22) Filed: Jan. 17, 2022

(65) Prior Publication Data
US 2022/0141269 A1 May 5, 2022

(51) Int. Cl.
*H04N 7/15* (2006.01)
*H04L 65/403* (2022.01)
*H04L 65/1069* (2022.01)
*H04L 65/75* (2022.01)
*H04L 9/40* (2022.01)

(52) U.S. Cl.
CPC .......... *H04N 7/15* (2013.01); *H04L 65/1069* (2013.01); *H04L 65/403* (2013.01); *H04L 65/765* (2022.05); *H04N 7/152* (2013.01); *H04L 63/04* (2013.01)

(58) Field of Classification Search
None
See application file for complete search history.

(56) References Cited

U.S. PATENT DOCUMENTS

| | | | | |
|---|---|---|---|---|
| 11,562,657 | B1* | 1/2023 | Fieldman | H04L 12/1827 |
| 11,570,220 | B1* | 1/2023 | Norheim | H04L 67/02 |
| 2006/0182249 | A1* | 8/2006 | Archambault | H04L 12/1818 379/202.01 |
| 2016/0234264 | A1* | 8/2016 | Coffman | H04L 65/4053 |
| 2017/0034224 | A1* | 2/2017 | Baram | H04L 65/765 |
| 2022/0353305 | A1* | 11/2022 | Han | H04L 65/403 |
| 2022/0353468 | A1* | 11/2022 | Walia | H04N 7/147 |
| 2023/0121137 | A1* | 4/2023 | Munoz | H04L 65/403 709/224 |

* cited by examiner

*Primary Examiner* — Quoc D Tran

(57) ABSTRACT

A system for secured video conferencing via virtual rooms, wherein the system comprises a first data processing system associated with a first user, wherein the first data processing system comprises a first processor module, configured to create a virtual room and a virtual lounge associated with the virtual room and create a unique virtual address for the virtual room created for the first user. The system further includes a second data processing system associated with a second user which is configured to receive the unique virtual address associated with the virtual room from the second user. The system further includes a server, wherein the server may be configured to host the virtual room created by the first data processing system and establish a secured connection between the first data processing system and the second data processing system when requested by the second user.

15 Claims, 15 Drawing Sheets

SYSTEM FOR SECURED VIDEO CONFERENCING VIA VIRTUAL ROOMS

BACKGROUND

Field of Invention

This application relates generally to the field of video conferencing. More particularly, the system relates to a secured video conferencing system via a virtual room associated to a user.

Discussion of Related Field

In this modern world, time saving is considered as one the most important factors to increase productivity and yield at the workplace. In this digital age, it has become much easier for anyone to connect and speak with the other person digitally and in turn save commute time etc.

However, in the current video conferencing tools that are available, the user has to create a meeting and schedule it every time the user wishes to communicate digitally with another user. This as a result, adds additional steps that need to be taken by the user to establish a video call, audio call or share data with the other user, because of which the user ends up spending a lot of time setting up the video conference.

Therefore, there is a need for a video conferencing system that eliminates the need for the user to create a meeting every single time and send invites to the plurality of users he/she wishes to communicate digitally.

SUMMARY

In an embodiment, a system for secured video conferencing via virtual rooms is disclosed wherein the system may comprise a first data processing system associated with a first user, the first data processing system may comprise a first processor module and a first digital client, wherein the first processor module may be configured to create a virtual room and a virtual lounge associated with the virtual room. The virtual room may be uniquely associated with the first user and the first processor module may create a unique virtual address for the virtual room created for the first user, wherein the virtual address enables access to the virtual lounge of the virtual room. The system may further include a second data processing system associated with a second user, wherein the second data processing system may comprise a second processor module and a second digital client. The second processor module may be configured to receive the unique virtual address for the virtual room from the second user. Additionally, the system may include a server, in a first configuration, may be configured to host the virtual room created by the first data processing system and establish a secured connection between the first data processing system and the second data processing system. Upon receiving the unique virtual address for the virtual room from the second user, the server may be configured to provide the second user, access to the virtual lounge of the virtual room upon establishing the secured connection between first data processing system and the second data processing system and notify the first user of the first data processing system that the second user is at the virtual lounge of the virtual room Further the server is configured to receive an instruction from the first user of the first data processing system to allow or disallow the second user into the virtual room to establish a video call with the first user, and establish the video call between the first user and the second user if the first user allows the second user into the virtual room.

BRIEF DESCRIPTION OF DRAWINGS

Embodiments are illustrated by way of example and not limitation in the figures of the accompanying drawings, in which like references indicate similar elements and in which.

DETAILED DESCRIPTION

The following detailed description includes references to the accompanying drawings, which form a part of the detailed description. The drawings show illustrations in accordance with example embodiments. These example embodiments, which may be herein also referred to as "examples" are described in enough detail to enable those skilled in the art to practice the present subject matter. However, it may be apparent to one with ordinary skill in the art, that the present invention may be practised without these specific details. In other instances, well-known methods, procedures and components have not been described in detail so as not to unnecessarily obscure aspects of the embodiments. The embodiments can be combined, other embodiments can be utilized, or structural, logical, and design changes can be made without departing from the scope of the claims. The following detailed description is, therefore, not to be taken in a limiting sense, and the scope is defined by the appended claims and their equivalents.

In this document, the terms "a" or "an" are used, as is common in patent documents, to include one or more than one. In this document, the term "or" is used to refer to a nonexclusive "or," such that "A or B" includes "A but not B," "B but not A," and "A and B," unless otherwise indicated.

Figure 1:
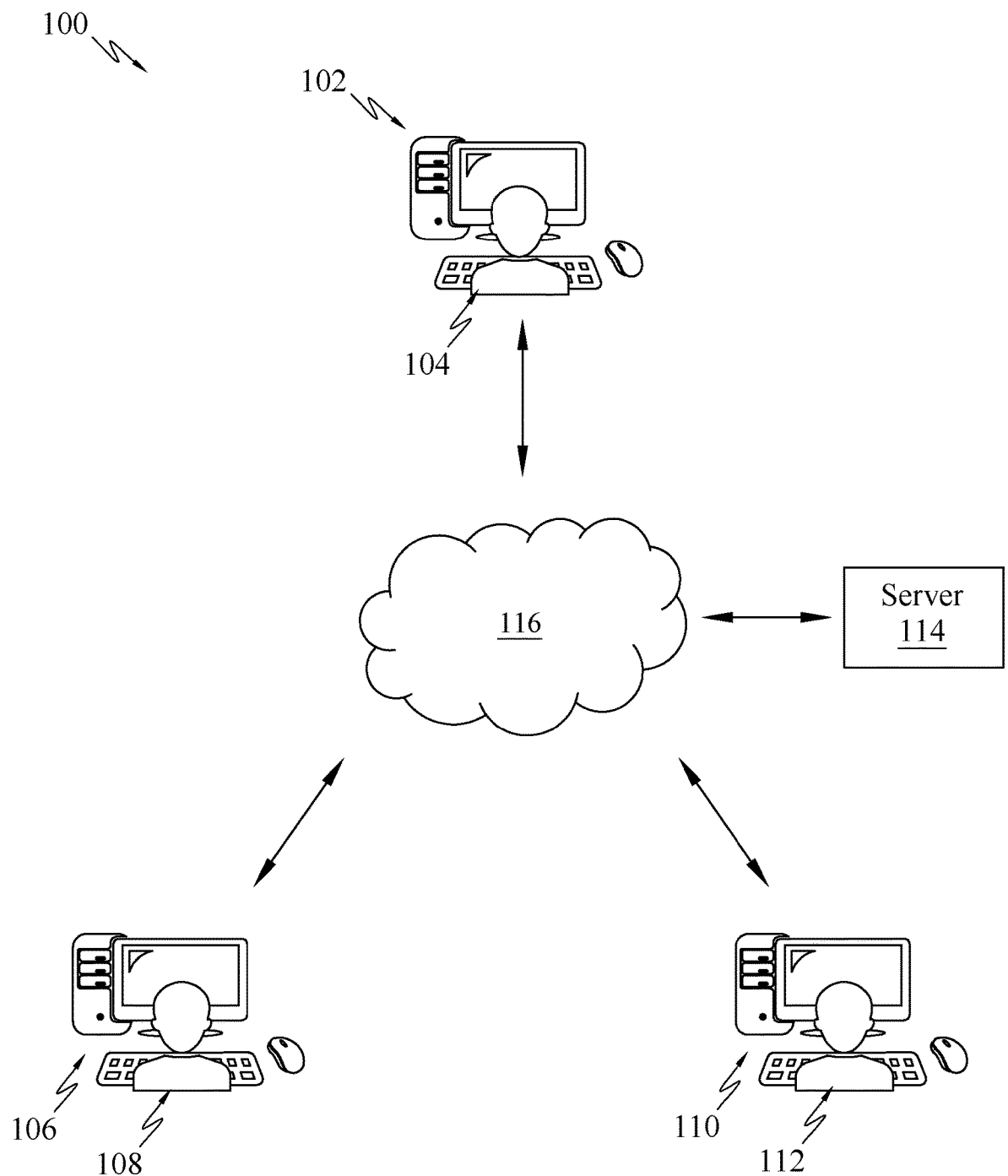
FIG. 1 illustrates a system 100 for secured video conferencing via virtual rooms, in accordance with an embodiment.

FIG. 1 illustrates a system 100 for secured video conferencing via virtual rooms, in accordance with an embodiment. The system 100 may comprise a first data processing system 102, wherein the first data processing system 102 is associated with a first user 104, a second data processing system 106, wherein the second data processing system 106 is associated with a second user 108, a third data processing system 110, wherein the third data processing system 110 is associated with a third user 112, and a server 114, wherein the server 114 is configured to coordinate a secured connection between the first data processing system 102, the second data processing system 106, and the third data processing system 110. The first data processing system 102, the second data processing system 106, the third data processing system 110 and the server 114 may further be connected and communicate with each other through a network 116. The network 116 may be a local area network, wide area network or a metropolitan area network.

In another embodiment, the system 100 may comprise a fourth data processing system, wherein the fourth data processing system is associated with a fourth user, a fifth data processing system, wherein the fifth data processing system is associated with a fifth user, and so on.

Figure 2:
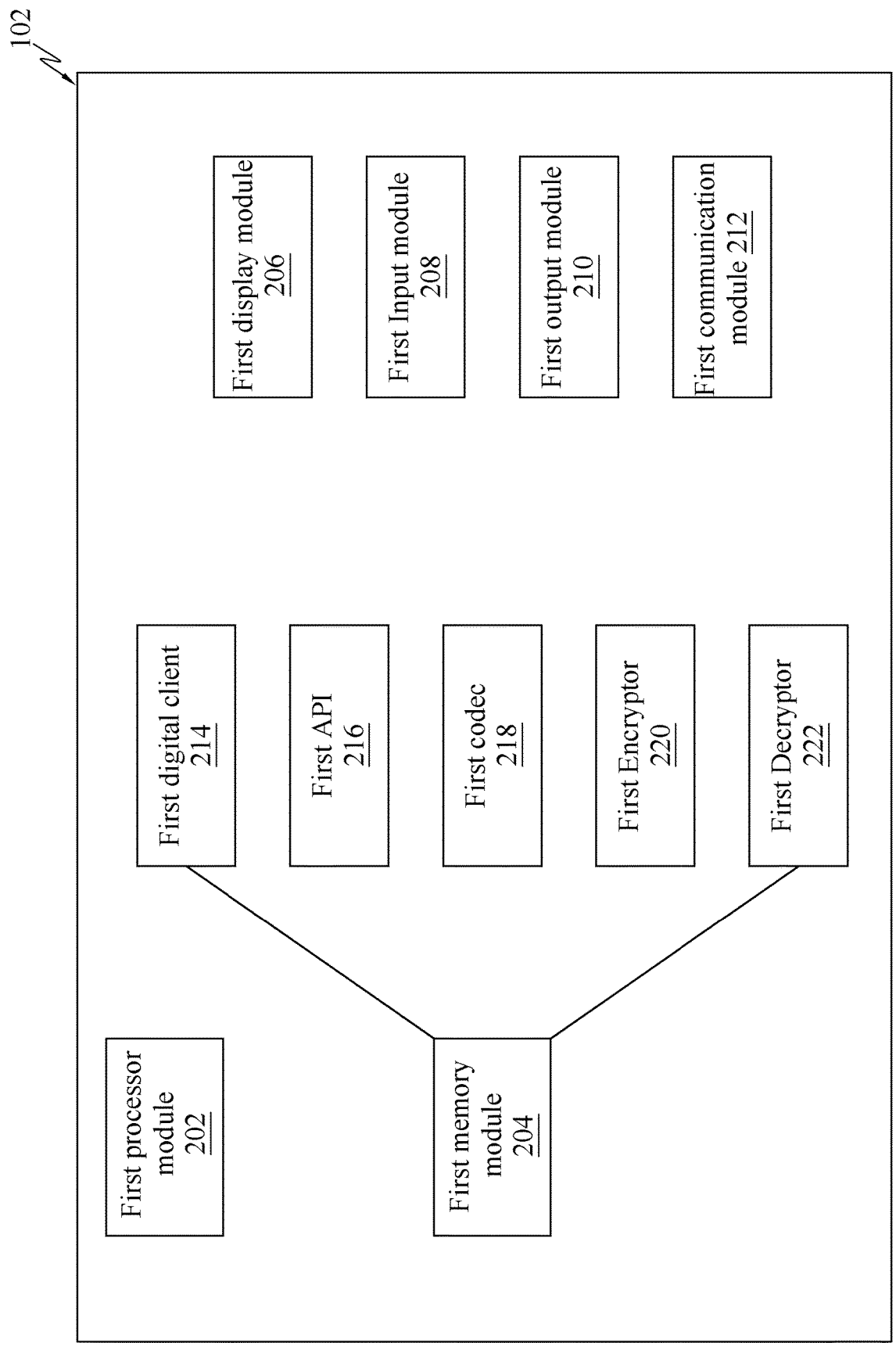
FIG. 2 is a block diagram illustrating a first data processing system 102, in accordance with an embodiment.

FIG. 2 is a block diagram illustrating a first data processing system 102, in accordance with an embodiment. The first data processing system 102 may comprise a first processor module 202, a first memory module 204, a first display module 206, first input modules 208, first output modules 210 and a first communication module 212.

The first processor module 202 may be implemented in the form of one or more processors and may be implemented as appropriate in hardware, computer-executable instructions, firmware, or combinations thereof. Computer-executable instruction or firmware implementations of the first processor module 202 may include computer-executable or machine-executable instructions written in any suitable programming language to perform the various functions described.

The first memory module 204 may include a permanent memory such as hard disk drive, may be configured to store data, and executable program instructions that are implemented by the processor module. The first memory module 204 may be implemented in the form of a primary and a secondary memory. The first memory module 204 may store additional data and program instructions that are loadable and executable on the first processor module 202, as well as data generated during the execution of these programs. Further, the first memory module 204 may be a volatile memory, such as random-access memory and/or a disk drive, or a non-volatile memory. The first memory module 204 may comprise of removable memory such as a Compact Flash card, Memory Stick, Smart Media, Multimedia Card, Secure Digital memory, or any other memory storage that exists currently or may exist in the future.

In an embodiment, the first memory module 204 may further comprise a first digital client 214, a first Application Programming Interface (API) 216, a first codec 218, a first encryptor 220 and a first decryptor 222. The first digital client 214 may be a web browser or a software application enables video conferencing, wherein the first digital client 214 may further comprise a first digital client display interface. The first digital client display interface may enable the interaction of the first user 104 with the first data processing system 102. The first codec 218 may include computer-executable or machine-executable instructions written in any suitable programming language to compress outgoing data and decompress incoming data. The first encryptor 220 may encrypt the data being sent and first decryptor 222 may decrypt the incoming data.

The first display module 206 may display an image, a video, or data to a user. For example, the first display module 206 may include a panel, and the panel may be an LCD, LED or an AM-OLED.

The first input modules 208 may provide an interface for input devices such as keypad, touch screen, mouse and stylus among other input devices. In an embodiment, the first input module 208 includes a camera and a microphone.

The first output modules 210 may provide an interface for output devices such as display screen, speakers, printer and haptic feedback devices, among other output devices.

The first communication module 212 may be used by the first data processing system 102 to communicate with the server 114. The first communication module 212, as an example, may be a GPRS module, or other modules that enable wireless communication.

Figure 3:
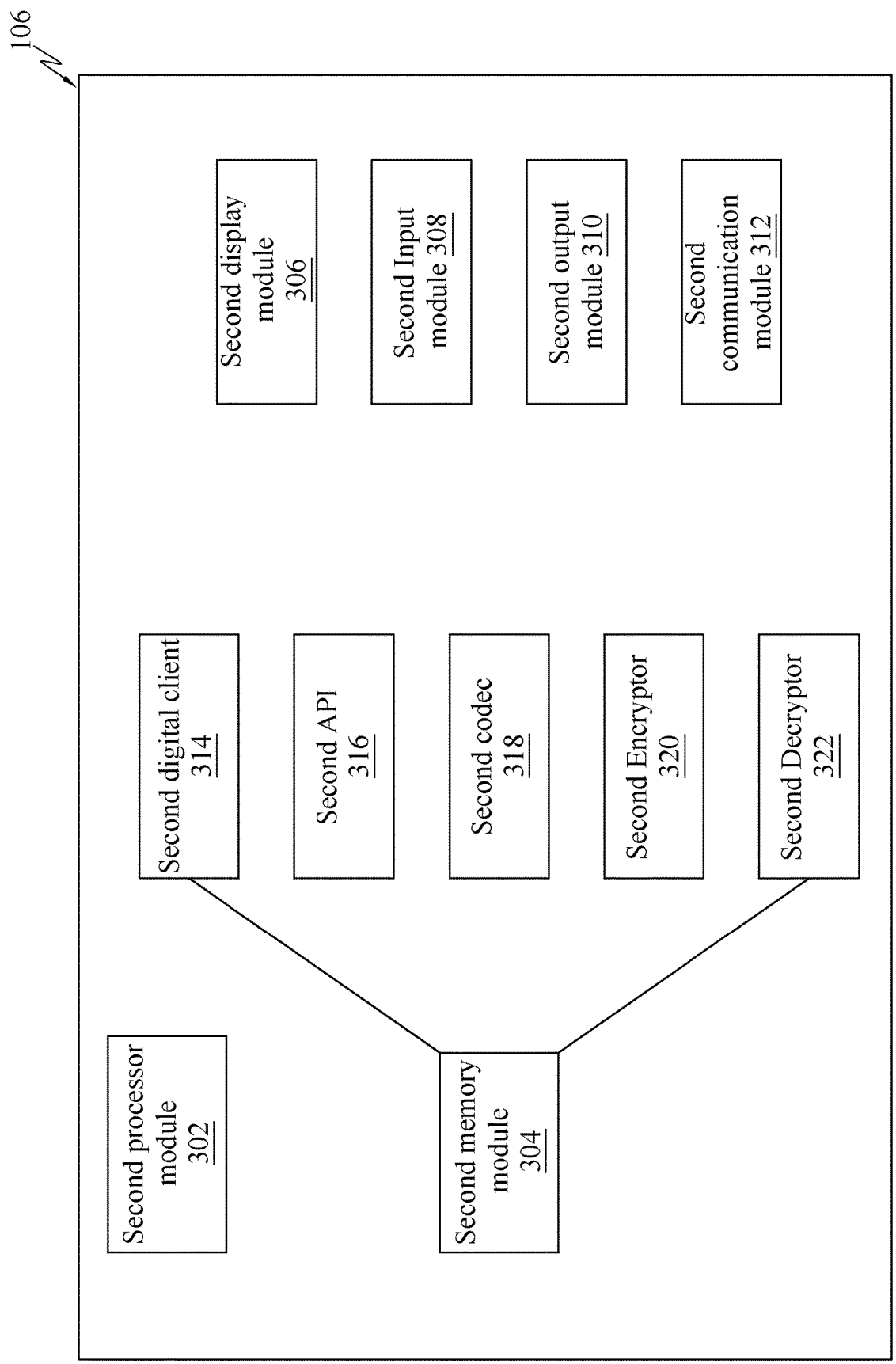
FIG. 3 is a block diagram illustrating a second data processing system 106, in accordance with an embodiment.

FIG. 3 is a block diagram illustrating a second data processing system 106, in accordance with an embodiment. The second data processing system 106 may comprise a second processor module 302, a second memory module 304, a second display module 306, second input modules 308, second output modules 310 and a second communication module 312.

It may be noted that the second data processing system 106, may have a similar architecture as that of the first data processing system 102.

In an embodiment, the third data processing system, the fourth data processing system, and so on, may have a similar architecture as that of the first data processing system 102.

Figure 4:
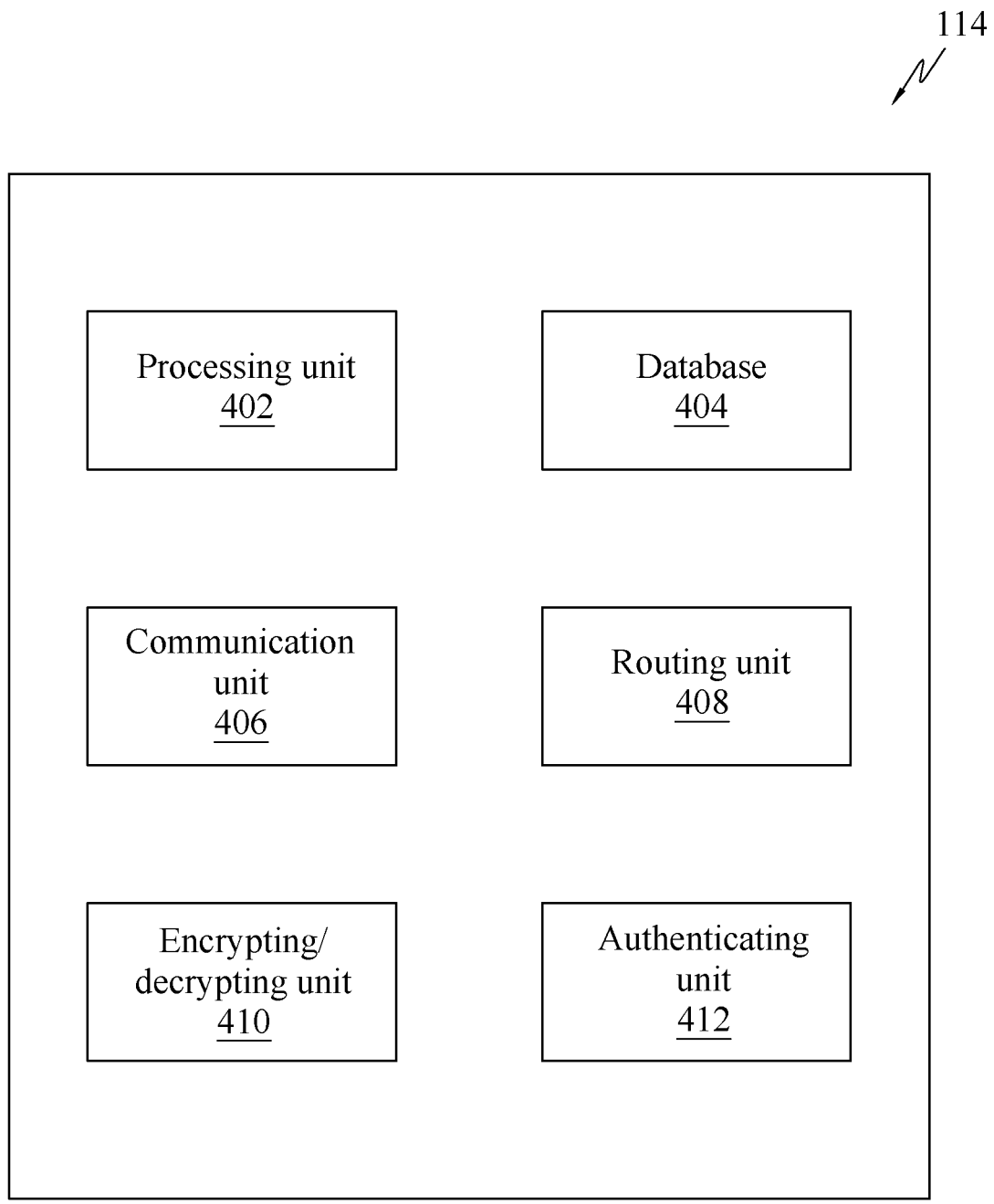
FIG. 4 is a block diagram illustrating the architecture of a server 110, in accordance with an embodiment.

FIG. 4 is a block diagram illustrating the architecture of a server 110, in accordance with an embodiment. The server 114 may comprise a processing unit 402, a database 404, a communication unit 406, a routing unit 408, an encrypting/decrypting unit 410 and an authenticating unit 412.

The processing unit 402 may be implemented in the form of one or more processors and may be implemented as appropriate in hardware, computer-executable instructions, firmware, or combinations thereof. Computer-executable instruction or firmware implementations of the processing unit 402 may include computer-executable or machine-executable instructions written in any suitable programming language to perform the various functions described.

The database 404 may include a permanent memory such as hard disk drive, may be configured to store data, and executable program instructions that are implemented by the processor module.

In one embodiment, the database 404 may be configured to store information related to the first user 104, the second user 108, the third user, and so on, which may not be limited to email ID, phone number of the users, information pertaining to the second data processing system 106, third data processing system and so on.

The communication unit 406 may be used by the server 114 to communicate with the first data processing system 102 and the second data processing system 106. The communication unit 406, as an example, may be a GPRS module, or other modules that enable wireless communication.

In an embodiment, the communication unit 406 may be used by the server 114 to communicate with the first data processing system 102 and the second data processing system 106, third data processing system, fourth data processing system, and so on.

The routing unit 408 may enable identification of data processing systems to which the data must be transmitted.

The encrypting/decrypting unit 410 may encrypt the incoming data from each of the data processing systems and decrypt the outgoing data from the server 114.

The authenticating unit 412 may authenticate each of the users associated with each of the data processing systems before establishing a connection.

Figure 5A:
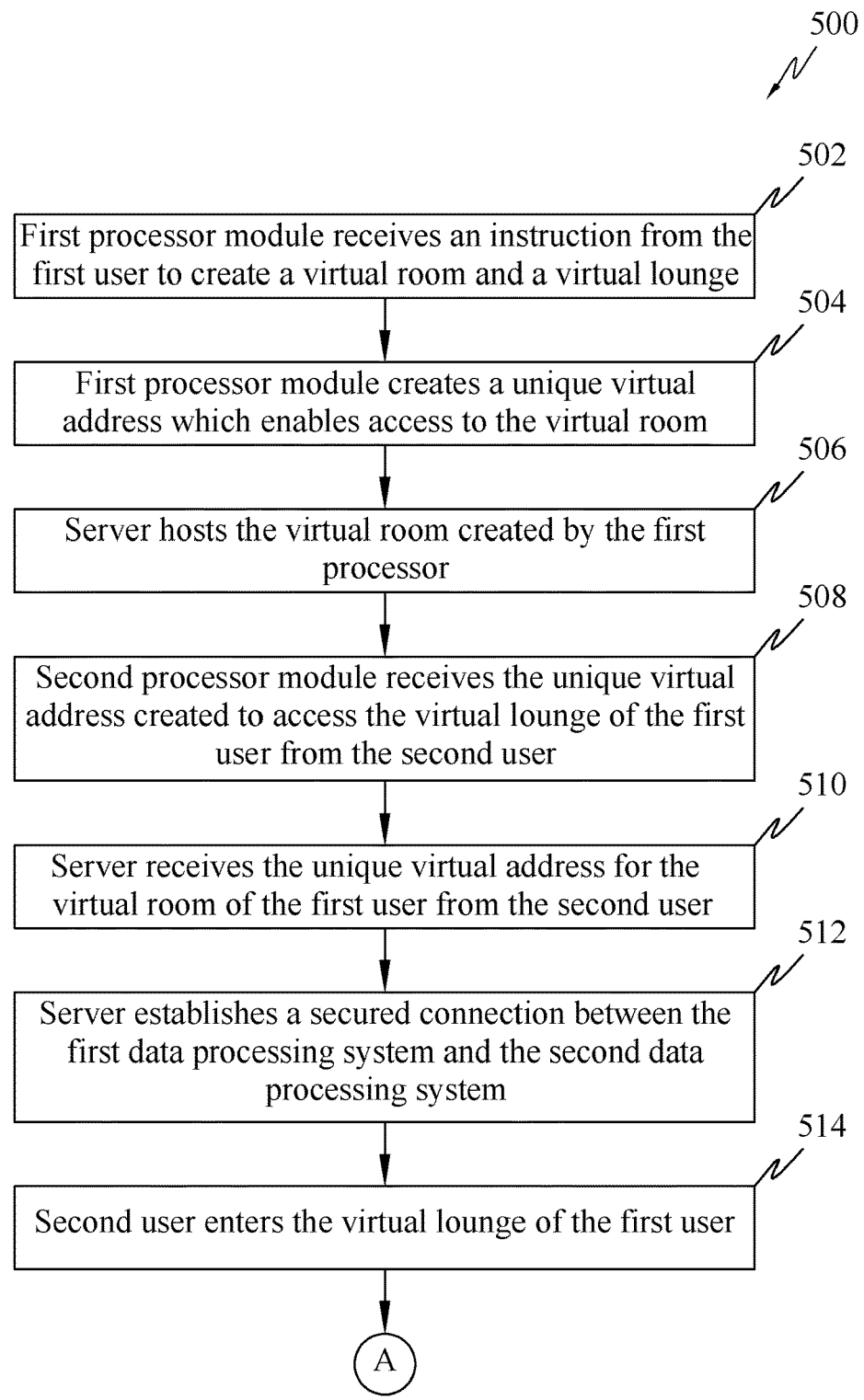
FIGS. 5A and 5B is a flowchart 500 illustrating the working of the system 100, in accordance with an embodiment.
Figure 5B:
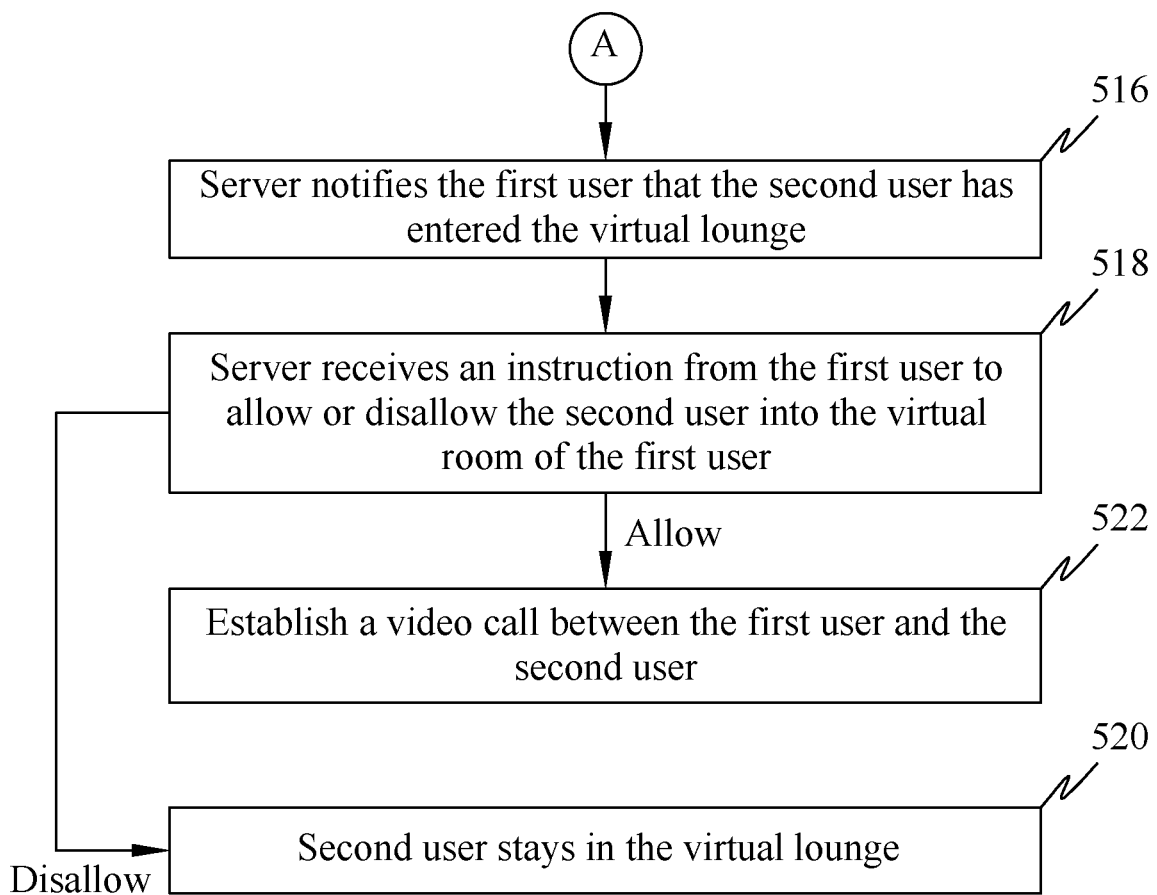

FIGS. 5A and 5B is a flowchart 500 illustrating the working of the system 100, in accordance with an embodiment. At step 502, the first processor module 202 associated with the first data processing system 102 may receive an instruction from the first user 104 to create a virtual room 600 and a virtual lounge 712 associated with the virtual room 600 for the first user 104.

At step 504, the first processor module 202 may create a unique virtual address which enables access to the virtual lounge 712 created for the first user 104 by the first processor module 202.

At step 506, the server 114 may be configured to host the virtual room 600 created by the first processor module 202.

At step 508, the second user 108 using the second input module 308 associated with the second data processing system 106, may input the unique virtual address of the virtual room 600 of the first user 104 to access the virtual lounge 712 of the virtual room 600.

At step 510, the server 114 may receive the unique virtual address from the second user 108 to access the virtual lounge 712 of the virtual room 600 of the first user 104.

At step 512, the server 114 may be configured to establish a secured connection between the first data processing system 102 and the second data processing system 106.

At step 514, the second user 108 may enter the virtual lounge 712 of the virtual room 600 of the first user 104.

At step 516, the server 114 may be configured to notify the first user 104 that the second user 108 has entered the virtual lounge 712 of the virtual room 600 of the first user 104.

At step 518, the server 114 may receive an instruction from the first user 104 to allow or disallow the second user 108 into the virtual room 600 from the virtual lounge 712 of the first user 104.

At step 520, if disallowed by the first user 104, the server 114 may be configured to disallow the second user 108 into the virtual room 600 from the virtual lounge 712 associated with the first user 104.

At step 522, if allowed by the first user 104, the server 114 may be configured to allow the second user 108 into the virtual room 600 from the virtual lounge 712 associated with the first user 104 and establish a video call between the first user 104 and the second user 108.

Figure 6:
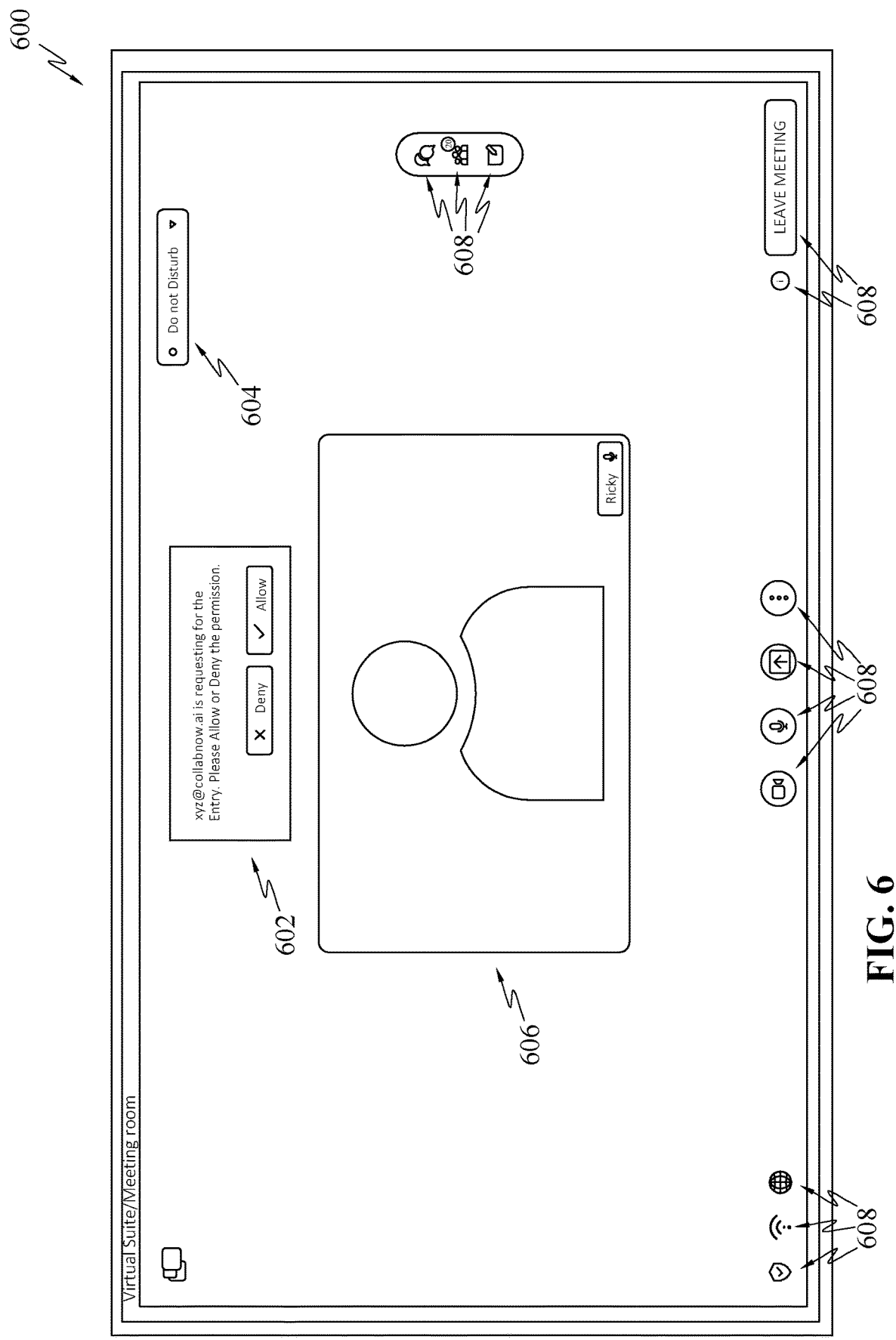
FIG. 6 illustrates a user interface 600 displayed to the first user 104 on the display of the first data processing system 102 when the second user 108 requests to enter the virtual room 600 when the first user 104 is present in the virtual room 600, in accordance with an embodiment.

FIG. 6 illustrates a user interface 600 displayed to the first user 104 on the display of the first data processing system 102 when the second user 108 requests to enter the virtual room 600 when the first user 104 is present in the virtual room 600, in accordance with an embodiment. An indicator 604 indicating the availability of the first user 104 may be displayed in the first display module 206 of the first data processing system 102. The first user 104 may set the indicator 604 representing the availability status from among a group including busy, away, available and do not disturb. In another embodiment, the server 114 may be configured to provide the first user 104 with a list of options to select the appropriate availability status of the virtual room.

The first display module 206 may display a first pop-up window 602, a first window 606 displaying contents being shared by the first user 104, and a plurality of clickable buttons 608 to enable user to provide inputs such as disconnect the video call, mute the microphone, share screen, leave meeting, internet connection status and so on.

According to one embodiment, the contents being shared by the first user 104 may include but not limited to a video stream, an audio stream, plurality of windows being displayed on the display module of the user sharing the screen, media streaming and so on.

In an embodiment, the server 114 may be configured to display the first pop-up window 602 to notify the first user 104 that the second user 108 is requesting to enter the virtual room 600 while the first user 104 is present in the virtual room 600, in accordance with an embodiment.

In an embodiment, the server 114, in a second configuration, may be configured to allow the second user 108 to access the virtual room 600 from the virtual lounge 712 without receiving an instruction from the first user 104 of the first data processing system 102 to establish the video call between the first user 104 and the second user 108.

As an example, we can consider that the first user 104 has configured his virtual room 600 without receiving an instruction to whether allow or disallow the second user 108 into the virtual room 600 associated with the first user 104. In this embodiment, when the second user 108 accesses the unique virtual address associated with the first user 104, after establishing a secured connection, the server 114 admits the second user 108 directly into the virtual room 600 and notifies the first user 104 that the second user 108 has entered the virtual room 600.

Figure 7:
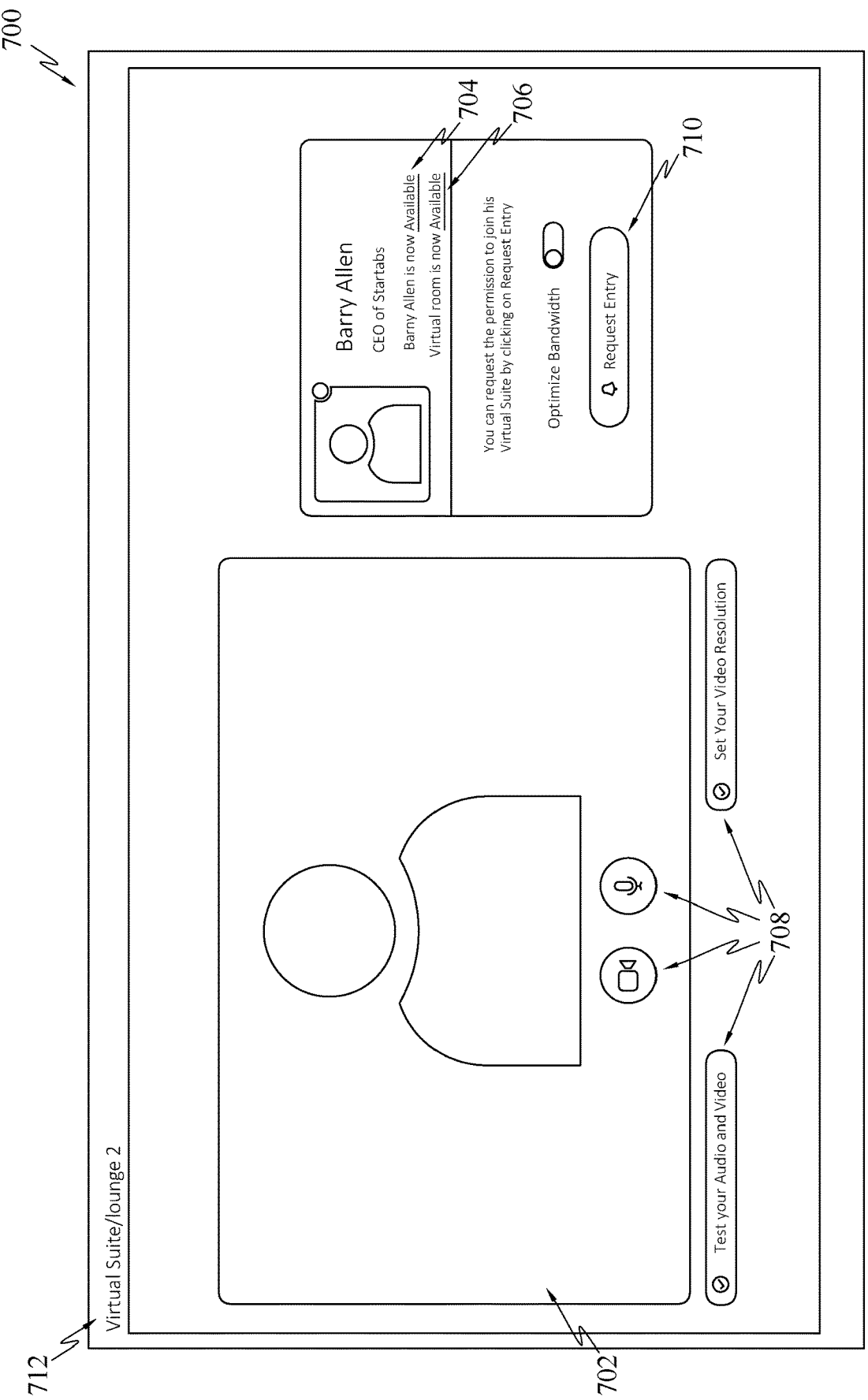
FIG. 7 illustrates the user interface 700 displayed to the second user 108 on the second display module 306 of the second data processing system 106, in accordance with an embodiment.

FIG. 7 illustrates the user interface 700 displayed to the second user 108 on the second display module 306 of the second data processing system 106, in accordance with an embodiment. In an embodiment, the server 114 may be configured to receive an instruction from the first user 104 to remove the second user 108 from the virtual lounge 712. Additionally, the server 114 may be configured to receive an instruction from the first user 104 to block the second user 108 from accessing the virtual lounge 712 of the first user 104.

In an embodiment, the server 114 may be configured to allow the users into the virtual lounge 712 of the virtual room 600 of the first user 104 after establishing a secured connection. Further the server 114 may be configured to allow the plurality of users present in the virtual lounge 712 associated with the first user 104 to communicate with the rest of the plurality of users waiting in the virtual lounge 712 associated with the first user 104.

In an embodiment, the second digital client may be configured to display the user availability indicator 704 and the virtual room availability indicator 706, wherein the user availability indicator 704 represents the availability of the first user 104 to the second user 108 when the second user 108 enters the virtual lounge 712. The status of virtual room indicated by the indicator 706 may include but not limited to available, busy, away, offline, do not disturb.

In another embodiment, the server 114 may be configured to provide an option to the second user 108 to request entry into the virtual room 600 from the virtual lounge 712 associated with the first user 104. Upon the second user 108 selecting the request entry icon 710, the server 114 may notify the first user 104 that the second user 108 is in the virtual lounge 712 of the virtual room 600 of the first user 104. The contents being displayed to the second user 108, after entering into the virtual lounge 712 associated with the first user 104, on the display of the second data processing system 106 may include a second window 702 wherein the second window 702 is configured to display the contents being shared by the second user 108, an indicator 704 indicating the availability of the first user 104, an indicator 706 indicating the status of the virtual room 600, a first clickable button 710 to request entry into the virtual room 600 and plurality of clickable buttons 608 to enable the second user 108 to provide inputs such as disconnect the video call, mute the microphone, share screen and so on.

According to another embodiment, the server 114 may be configured to receive a request from the second user 108 to get notified when the indicator 704 associated with the first user 104 changes to available.

Figure 8:
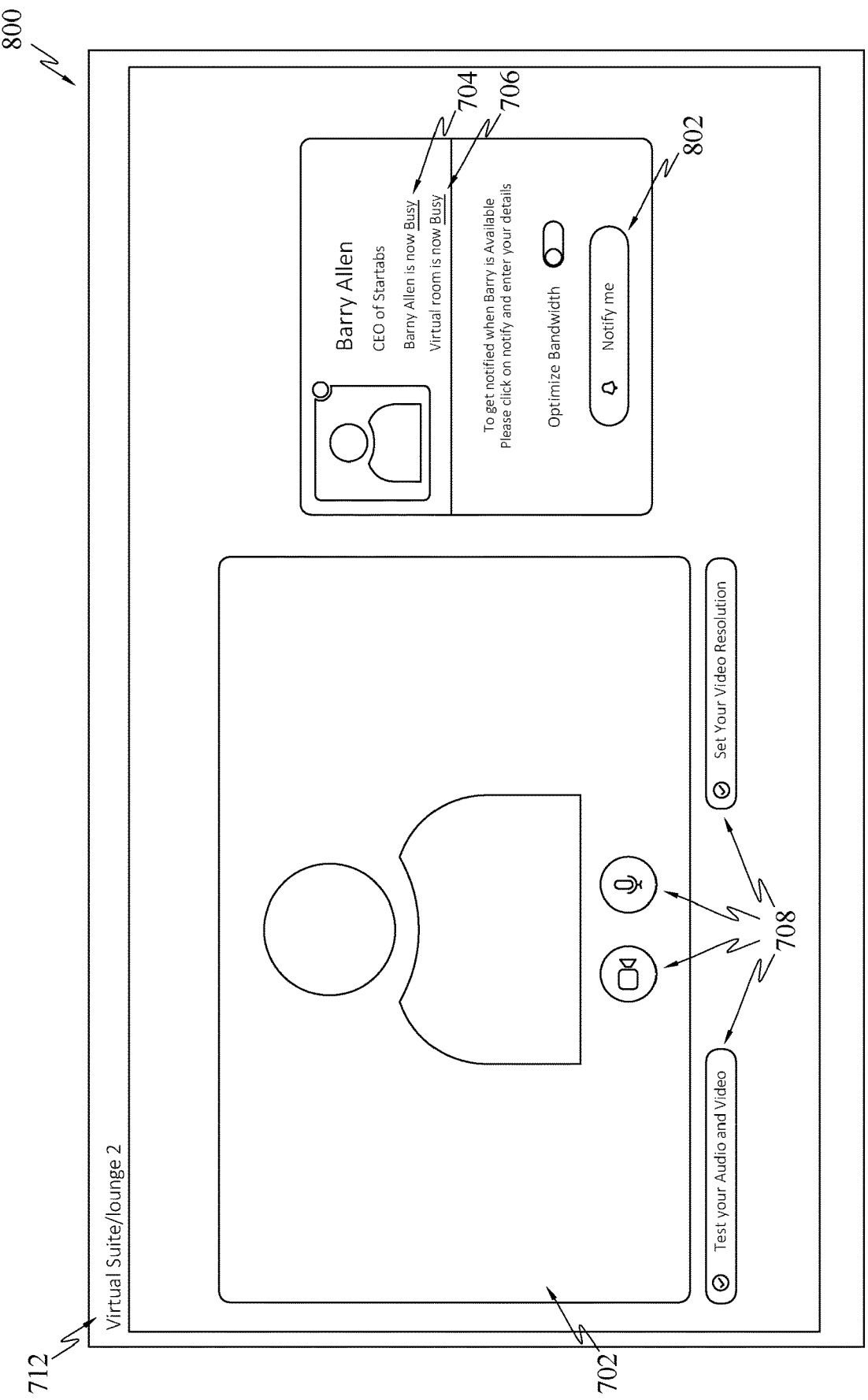
FIG. 8 illustrates the user interface 800 displayed to the second user 108 on the display of the second data processing system 106 to enable being notified when the first user 104 becomes available for the video call, in accordance with an embodiment.

FIG. 8 illustrates the user interface 800 displayed to the second user 108 on the display of the second data processing system 106 to enable being notified when the first user 104 becomes available for the video call, in accordance with an embodiment. The contents being displayed to the second user 108 on the display of the second data processing system 106 may include the second window 702, an indicator 704 indicating the availability of the first user 104, an indicator 706 indicating the status of the virtual room 600, a second clickable button 802 to request to get notified when the first user 104 becomes available to establish a video call and a plurality of clickable buttons 708 to enable the second user 108 to provide inputs such as disconnect the video call, mute the microphone, share screen and so on.

Figure 9:
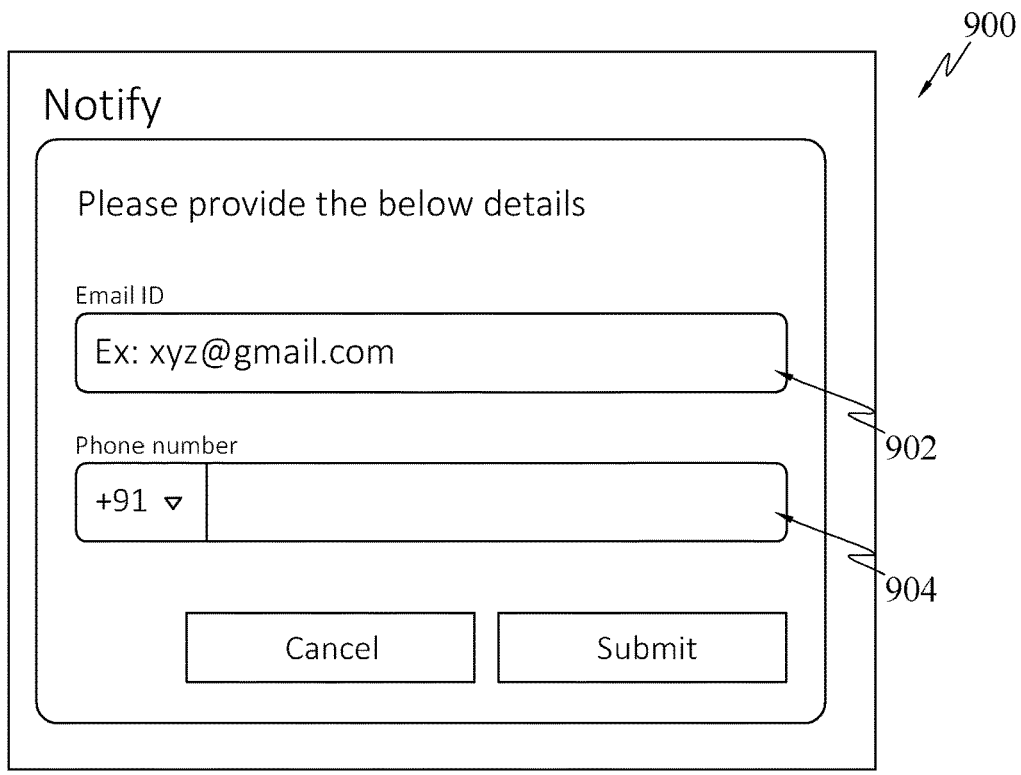
FIG. 9 illustrates a second pop-up window 900 which may be displayed to the second user 108 on the display of the second data processing system 106 to input user details to get notified when the first user 104 becomes available for the video call, in accordance with an embodiment.

FIG. 9 illustrates a second pop-up window 900 which may be displayed to the second user 108 on the display of the second data processing system 106 to input user details to get notified when the first user 104 becomes available for the video call, in accordance with an embodiment. The user may input details in the second pop-up window 900 to get notified in a way preferred by the second user 108, wherein the window may request the second user 108 to input user details which may be, but not limited to, email ID 902 and phone number 904 associated with the second user 108.

Figure 10:
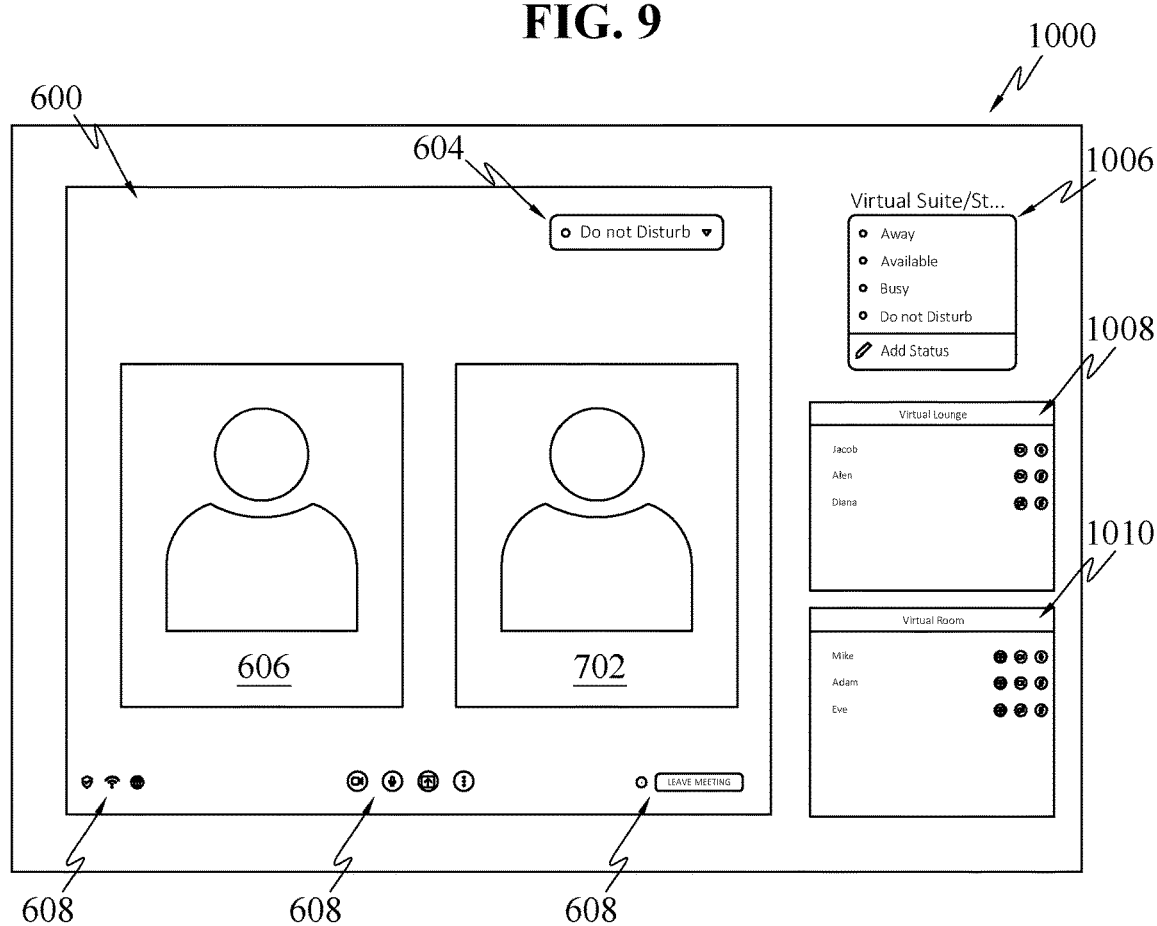
FIG. 10 illustrates the user interface 1000 displayed to the first user 104 by the display module of the first data processing system 102 when the video call is established by the server 114, in accordance with an embodiment.

FIG. 10 illustrates the user interface 1000 displayed to the first user 104 by the display module of the first data processing system 102 when the video call is established by the server 114, in accordance with an embodiment. The first display module 206 may be configured to display the indicator 604 indicating the availability of the first user 104, an option list 1006 to select appropriate status of the first user 104, list of people 1008 present in the virtual lounge 712, list of people 1010 present in the virtual room 600, the first window 606, the second window 702 and the plurality of clickable buttons 608 to enable user to provide inputs such as disconnect the video call, mute the microphone, share screen and so on. The first window 606 may be configured to display the contents being shared by the first user 104 and the second window 702 may be configured to display the contents being shared by the second user 108.

In an embodiment, the server 114 may be configured to receive the unique virtual address associated with the virtual room 600 of the first user 104 from the third user 112 associated with the third data processing system 110. The server 114 may further be configured to establish a secured connection between the third data processing system 110 and the first data processing system 102 when the first user 104 is on a video call with the second user 108.

Figure 11:
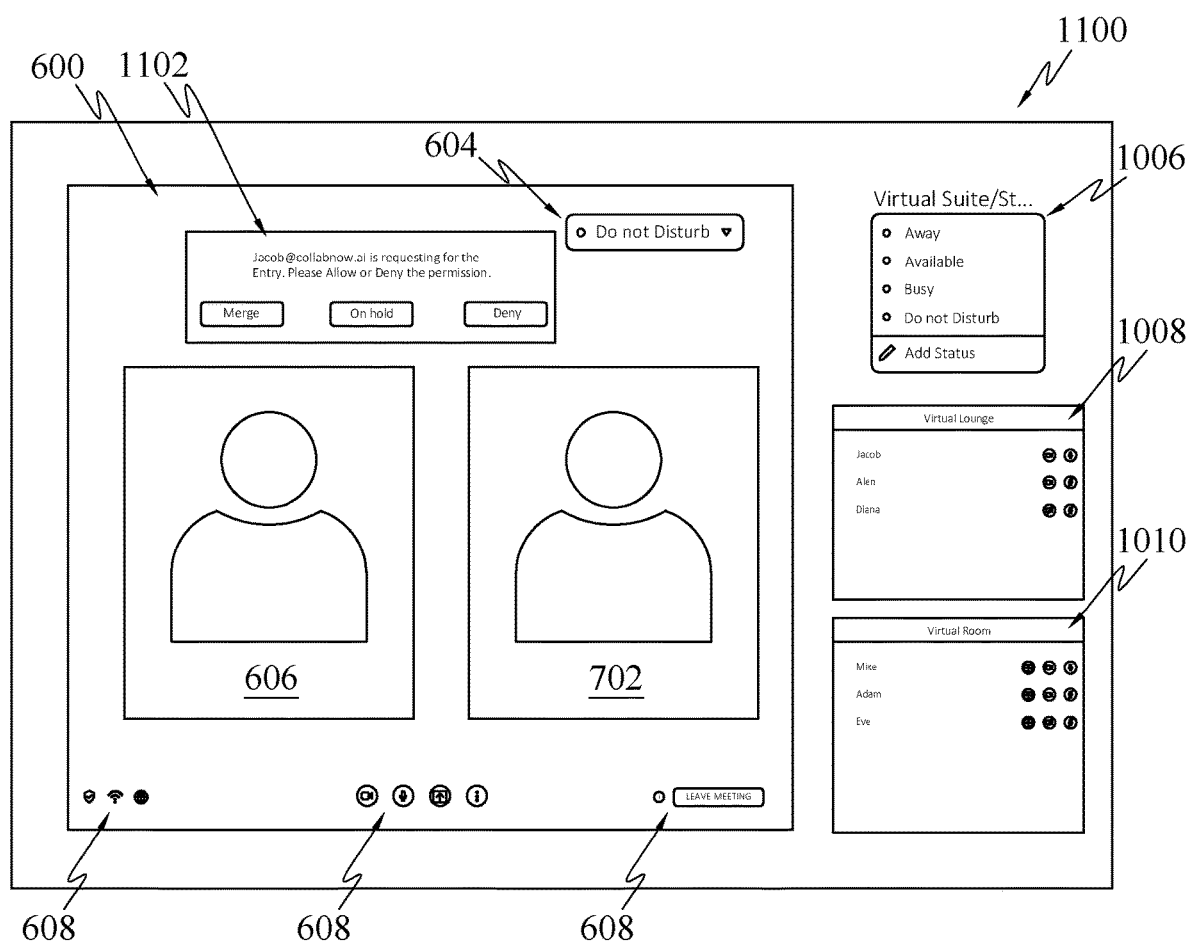
FIG. 11 illustrates the user interface 1100 displayed to the first user 104 by the display module 206 of the first data processing system 102 when the third user 112 requests to enter into the virtual room 600, in accordance with an embodiment.

FIG. 11 illustrates the user interface 1100 displayed to the first user 104 by the display module 206 of the first data processing system 102 when the third user 112 requests to enter into the virtual room 600, in accordance with an embodiment. The server 114 may be configured to notify the first user 104 when the third user 112 enters the virtual lounge 712 of the first user 104. A third pop-up window 1102 is displayed on the display associated with the first user 104. Further, the server 114 may be configured to receive an instruction from the first user 104 to allow or disallow the third user 112 into the virtual room 600 of the first user 104.

In accordance with an embodiment, the server 114 may be configured to provide the first user 104 with three options. The options displayed to the first user 104 may include, but not limited to, merge, on hold, and deny. When the server 114 receive an instruction from the first user 104 to merge the call, the third user 112 is admitted into the virtual room and is configured to communicate with the other participants of the virtual room 600. When the server 114 receives an instruction from the first user 104 to put the call on hold, the server 114 is configured to disconnect the video call between the first user 104 and the second user 108 and move the second user 108 to the virtual lounge 712. The sever may further be configured to admit the third user 112 into the virtual room 600 and establish a video call between the first user 104 and the third user 112. Further, the server 114 is configured to deny entry to the third user 112 into the virtual room 600 when the server receives an instruction from the first user 104 to deny the request from entry from the third user 112.

Figure 12:
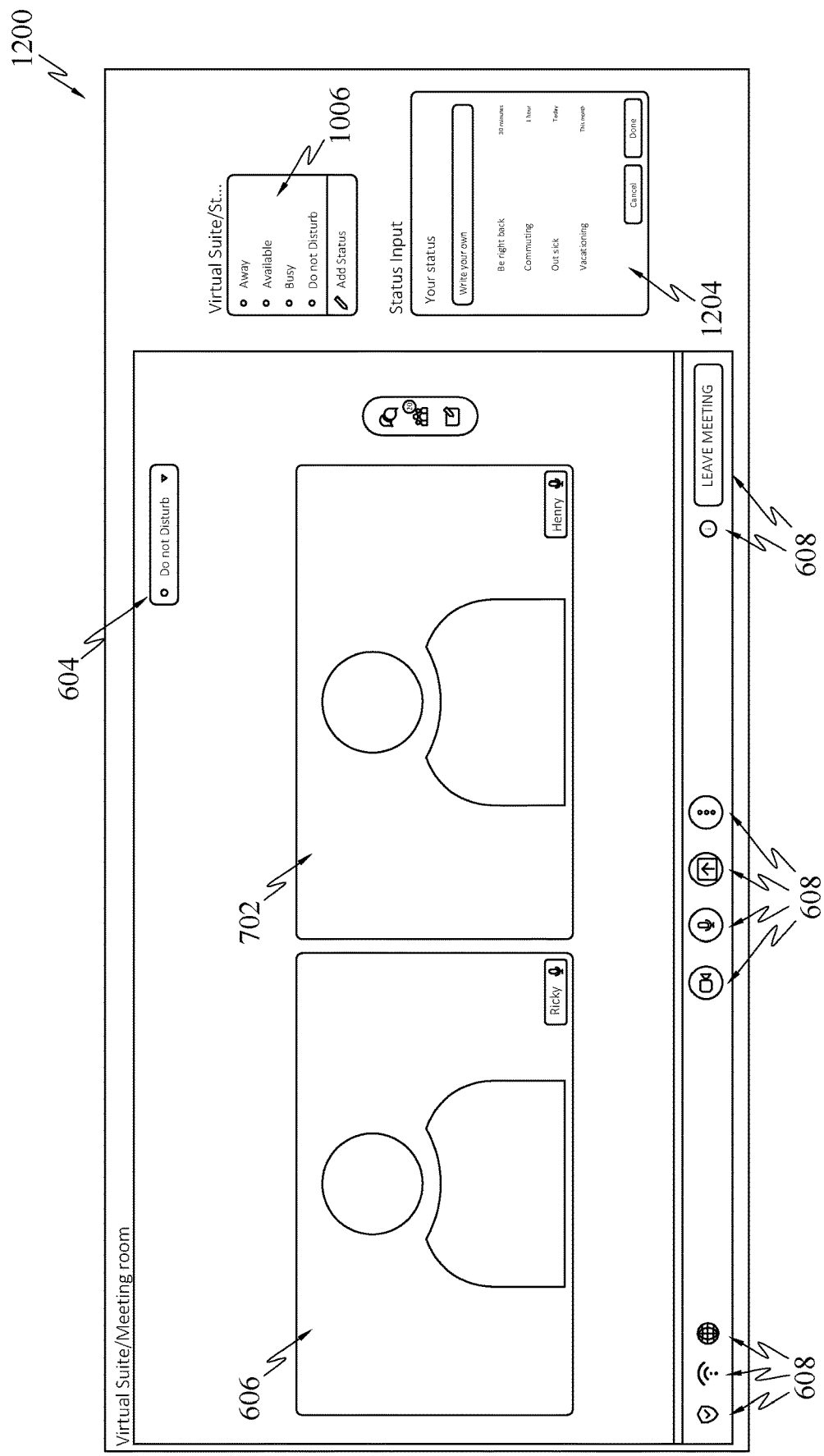
FIG. 12 illustrates the user interface 1200 displayed to the first user 104 by the display module of the first data processing system 102 when the video call with the second user 108 is established by the server 114, in accordance with an embodiment.

FIG. 12 illustrates the user interface 1200 displayed to the first user 104 by the display module of the first data processing system 102 when the video call with the second user 108 is established by the server 114, in accordance with an embodiment. The display module associated with the second data processing system 106 may be configured to display the indicator 604 indicating the availability of the first user 104, wherein the first user 104 may select the indicator 604 from a group of indicators 1006, a status 1204 of the first user 104, wherein the first user 104 may input a custom status 1204, the first screen, the second screen and the plurality of clickable buttons 608 to enable user to provide inputs such as disconnect the video call, mute the microphone, share screen and so on.

In one embodiment, the windows associated with the status 1204, group of indicators 1006, the virtual lounge 712, the virtual room 600, and so on, may be configured to be minimised to enable incorporation of plurality of windows displaying information.

In another embodiment, the first processor may be configured to receive an instruction from the first user 104 to create a plurality of unique virtual sub-lounges wherein each of the virtual sub-lounges is configured to allow selected users as pre-configured by the first user 104.

Figure 13:
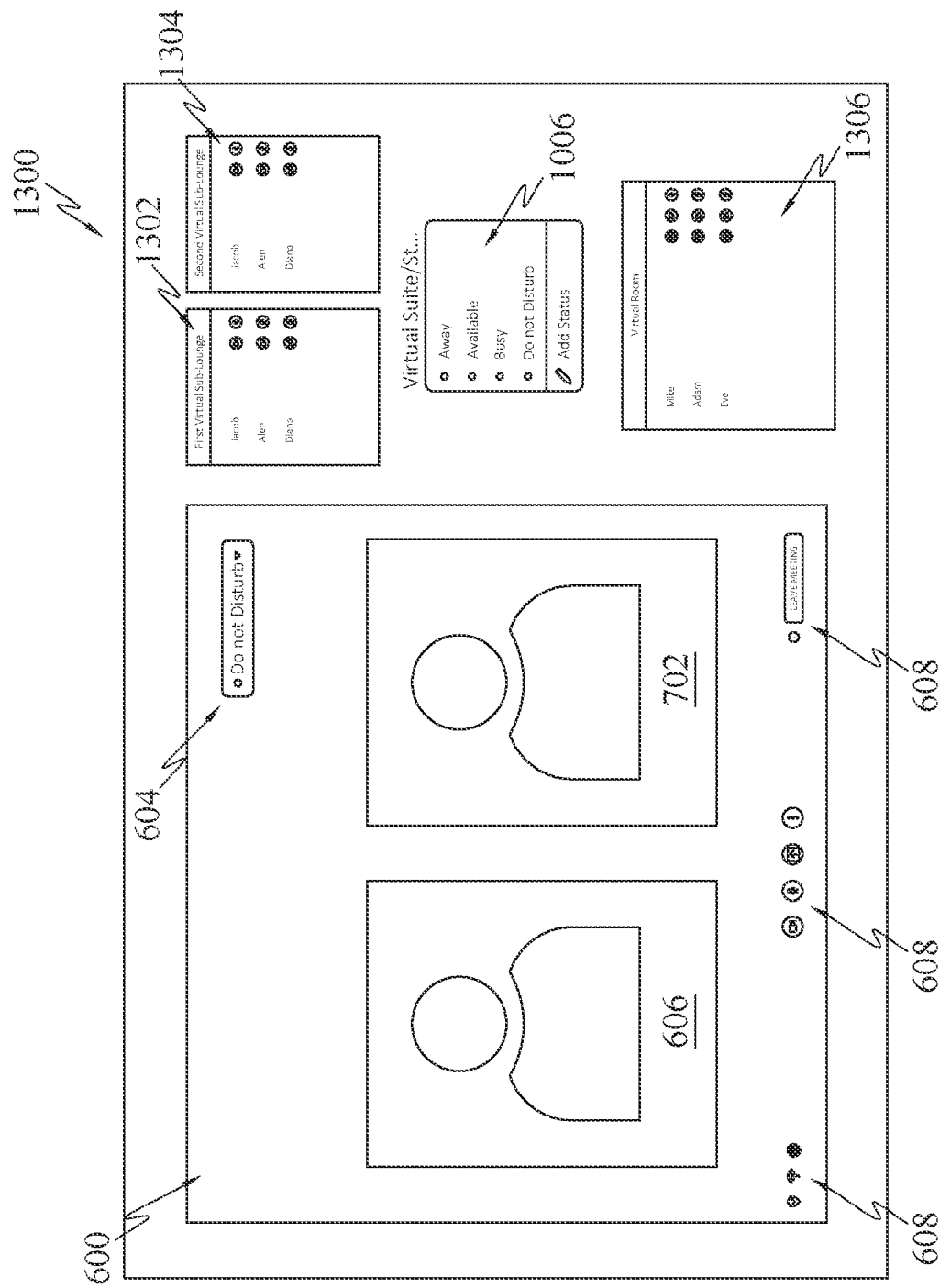
FIG. 13 illustrates the user interface 1300 displayed to the first user 104 by the display module 206 of the first data processing system 102 when the first user 104 is in the virtual room 600 with the second user 108, in accordance with an embodiment.

FIG. 13 illustrates the user interface 1300 displayed to the first user 104 by the display module 206 of the first data processing system 102 when the first user 104 is in the virtual room 600 with the second user 108, in accordance with an embodiment. The first display module 206 may be configured to display the indicator 604 indicating the availability of the first user 104, the option list 1006 to enable the first user 104 to select the availability status, list of names of users present in a first virtual sub-lounge 1302 and a second virtual sub-lounge 1304, list of names of the users currently in the video conference 1306, the first window 606, the second window 702 and the plurality of clickable buttons 608 to enable the first user 104 to provide inputs such as disconnect the video call, mute the microphone, share screen and so on.

Figure 14A:
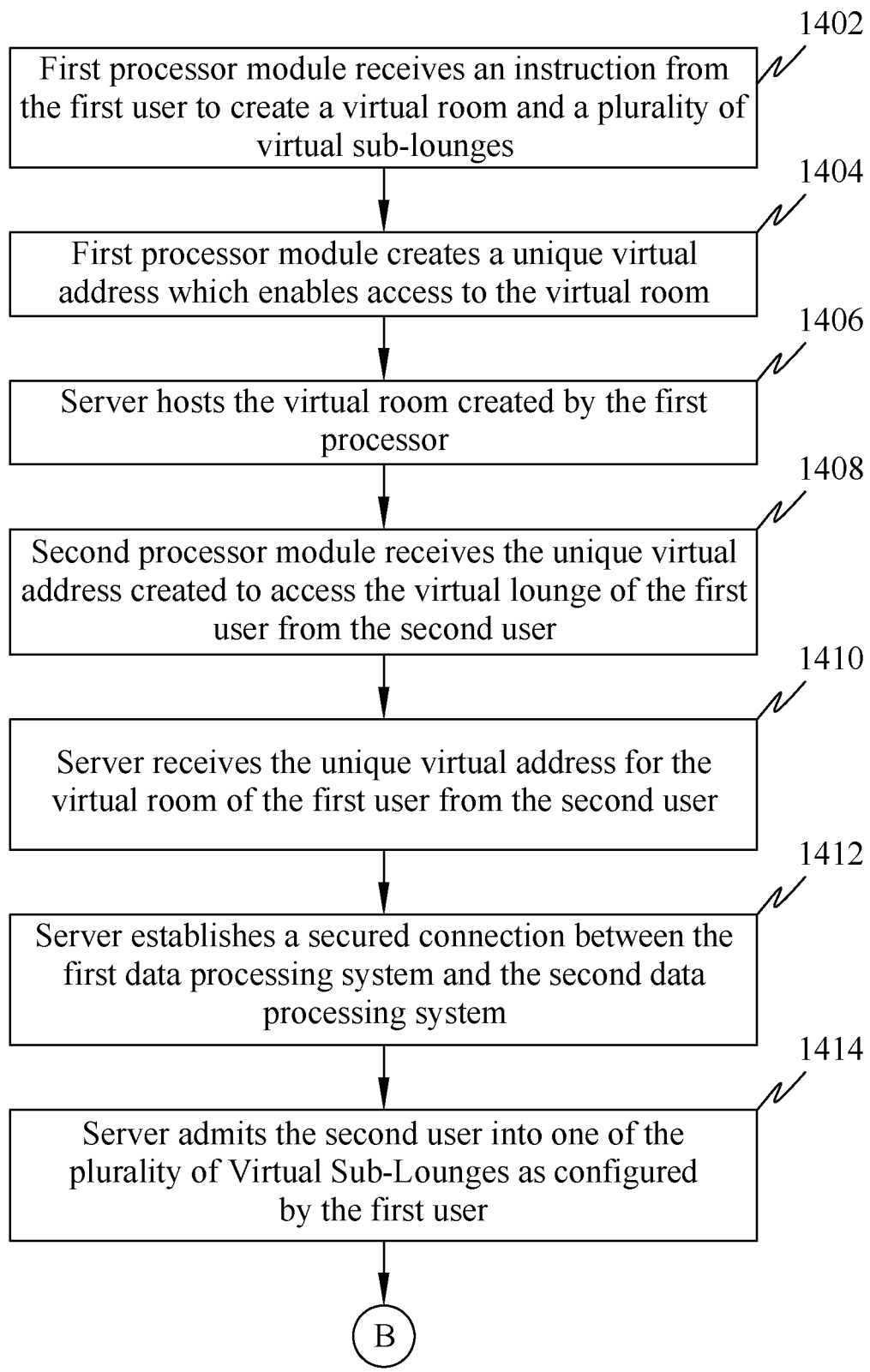
FIGS. 14A and 14B illustrates a flowchart 1400 of the working of the system 100 with plurality of virtual sub-lounges, in accordance with an embodiment.
Figure 14B:
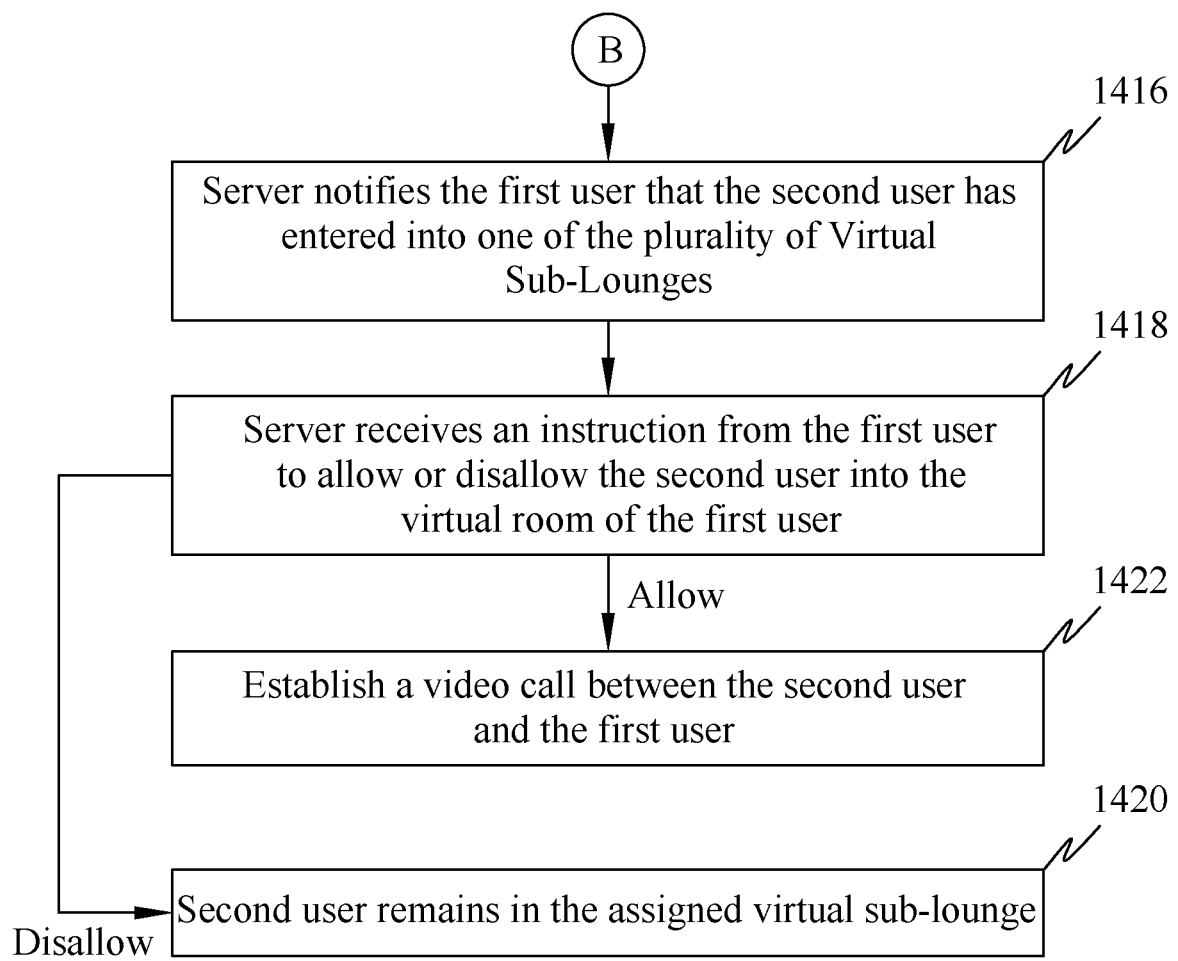

FIGS. 14A and 14B illustrates a flowchart 1400 of the working of the system 100 with plurality of virtual sub-lounges, in accordance with an embodiment. At step 1402, the first processor module 202 associated with the first data processing system 102 may receive an instruction from the first user 104 to create a virtual room 600 and a plurality of virtual sub-lounges associated with the virtual room 600 for the first user 104.

At step 1404, the first processor module 202 may create a unique virtual address which enables access to the virtual room 600 created for the first user 104 by the first processor module 202.

At step 1406, the server 114 may be configured to host the virtual room 600 created by the first processor module 202.

At step 1408, the second user 108 using the input modules associated with second data processing system 106 wherein the second user 108 may input the unique virtual address associated with the virtual room 600 of the first user 104.

At step 1410, the server 114 may receive the unique virtual address from the second user 108 to access the virtual room 600 of the first user 104.

At step 1412, the server 114 may be configured to establish a secured connection between the first data processing system 102 and the second data processing system 106.

At step 1414, the server 114 is configured to admit the second user 108 into a pre-assigned virtual sub-lounge from the plurality of virtual sub-lounges associated with the virtual room 600 of the first user 104. In one embodiment, the server 114 may be configured to automatically select users and assign them to the appropriate virtual sub-lounge based on projects the user is involved in, organization name, user credentials (all team leaders, all project managers etc), time of the day and so on.

At step 1416, the server 114 may be configured to notify the first user 104 when the second user 108 is admitted into one of the plurality of virtual sub-lounges associated with the virtual room 600 of the first user 104.

In one embodiment, the server 114 may be configured to notify the first user 104 for each of the plurality of users when they enter the virtual sub-lounge of the virtual room 600 of the first user 104. The server 114 may further be configured to notify the user via a pop-up window displayed on the first display module 206 of the first data processing system 102 when each of the plurality of users is being admitted into the virtual lounge 712 or into any of the plurality of virtual sub-lounges.

In another embodiment, the first user 104 configured the virtual room 600 such that, the first user 104 is notified and requested to input an instruction to either allow or disallow each of the plurality of the users trying to enter the virtual sub-lounges or the virtual room 600 associated with the first user 104.

At step 1418, the server 114 may receive an instruction from the first user 104 to allow or disallow the second user 108 into the virtual room 600 from the pre-assigned virtual sub-lounge associated with the virtual room 600 of the first user 104.

In an embodiment, the server 114 may be configured to receive an instruction from the first user 104 to allow all the users with one click of a button being displayed on the display module associated with the first data processing system 102 to enable entry from the virtual sub-lounge into the virtual room 600.

At step 1420, if disallowed by the first user 104, the server 114 may be configured to disallow the second user 108 into the virtual room 600 from the pre-assigned virtual sub-lounge associated with the virtual room 600 of the first user 104.

At step 1422, if allowed by the first user 104, the server 114 may be configured to allow the second user 108 into the virtual room 600 from the pre-assigned virtual sub-lounge associated with the virtual room 600 of the first user 104. and establish a video call.

In an embodiment, the server 114 may be configured to receive an instruction from the first user 104 to display a blurry screen with a video stream and a distorted audio of an audio stream of a video call between the first user 104 and the second user 108 in the virtual room 600 to the users waiting in the virtual lounge 712 of the first user 104.

In another embodiment, the server 114 may be configured to receive an instruction from the first user 104 to display the name of the second user 108, third user 112 and so on, present in the video conference in the virtual room 600 to the users waiting in the virtual lounge 712 of the virtual room 600.

Example One

In this example, we have a company named "XYZ" which is owned and managed by a person named "Barry". There are 25 employees in the company because of which Barry pre-configured his "XYZ Virtual Lounge" to be an open lounge, wherein participants in the XYZ Virtual Lounge are allowed to communicate to each other. Also, the XYZ Virtual Lounge is configured to display a blurry image of the conversation happening in the virtual room associated with Barry to the users waiting in the virtual lounge.

Now, another user named "Cisco" from "ABC" accesses the link associated with Barry's virtual room. After establishing a secured connection, the server, allows Cisco into "ABC Virtual Lounge" wherein only employees or users associated with ABC are able to see and interact with each other while waiting in the ABC Virtual Lounge. Additionally, participants of ABC lounge are not allowed to hear or see the contents being shared in the virtual room. Also, participants of XYZ Virtual Lounge are not allowed to interact with participants waiting in ABC Virtual Lounge.

Similarly, when another employee, "Katelyn", from "EFG" accesses the virtual address associated with Barry, another virtual sub-lounge named "EFG Virtual Lounge" is created and Katelyn is allowed into that virtual sub-lounge. EFG Virtual Lounge and ABC Virtual Lounge have similar configurations.

By employing aforementioned example, the user is able to disallow third-party users from interacting or getting disturbed by employees while waiting. This in most cases helps keeps the company information secure.

Example Two

In this example, "Clark", a Project Manager working at "LMN" in the product testing department creates a Virtual Room. He is managing 3 projects which are named: Team-A, Team-B, and Team-C and each team has 5 team members. He receives orders from his colleague "Rose", one of the prominent members of the leadership. Similarly, "Frank" is a Project Manager belonging to the product development department at the same company.

Clark has configured his virtual lounge in such a way, that one sub-lounge is allotted per team. From morning 9:00 AM to 6:00 PM (office hours), each team members are allowed into their respective sub-lounges which only their team members can participate (Team-A's Virtual Lounge, Team-B's Virtual Lounge, and Team-C's Virtual Lounge), members of the leadership, in this case Rose (Rose's Virtual Lounge), are allotted separate virtual sub-lounges, and Frank (Product Development Virtual Lounge) is allowed into his own virtual sub-lounge.

After 6:00 PM to 9:00 AM of the following day, the configuration is updated automatically according to the configuration chosen by Clark. In this case, all the team members are allowed into a single virtual sub-lounge where they are allowed to interact with each other. However, settings for sub-lounges belonging to members of leadership, and other project managers remains same throughout the day, as configured by Clark.

For the sake of brevity let's consider Clark is interacting with team members of Team-A during office hours in his virtual room. Rose accesses the link associated with Clark's virtual room and is allowed in to the "Rose's Virtual Lounge" and a notification is sent to Clark. Clark now chooses to instruct all members of Team-A to be moved to Team-A's Virtual Room and allow Rose into the virtual room to start the video conference. Once the video call with Rose is disconnected, participants waiting in the Team-A's Virtual Room are allowed back into the virtual room.

The processes described above is described as a sequence of steps, this was done solely for the sake of illustration. Accordingly, it is contemplated that some steps may be added, some steps may be omitted, the order of the steps may be re-arranged, or some steps may be performed simultaneously.

Although embodiments have been described with reference to specific example embodiments, it will be evident that various modifications and changes may be made to these embodiments without departing from the broader spirit and scope of the system and method described herein. Accordingly, the specification and drawings are to be regarded in an illustrative rather than a restrictive sense.

Many alterations and modifications of the present invention will no doubt become apparent to a person of ordinary skill in the art after having read the foregoing description. It is to be understood that the phraseology or terminology employed herein is for the purpose of description and not of limitation. It is to be understood that the description above contains many specifications, these should not be construed as limiting the scope of the invention but as merely providing illustrations of some of the personally preferred embodiments of this invention.

What is claimed is:

1. A system for secured video conferencing via virtual rooms comprising:

a first data processing system associated with a first user, the first data processing system comprises a first processor module and a first digital client, wherein the first processor module is configured to:
  create a virtual room and a virtual lounge associated with the virtual room, wherein the virtual room is uniquely associated with the first user; and
  create a unique virtual address for the virtual room created for the first user, wherein the virtual address enables accessing the virtual lounge of the virtual room;
a second data processing system associated with a second user, the second data processing system comprises a second processor module and a second digital client, wherein the second processor module is configured to:
  receive the unique virtual address for the virtual room from the second user; and
a server, in a first configuration, configured to:
  host the virtual room created by the first data processing system;
  establish a secured connection between the first data processing system and the second data processing system, upon receiving the unique virtual address for the virtual room from the second user;
  provide the second user, access to the virtual lounge of the virtual room upon establishing the secured connection between first data processing system and the second data processing system;
  notify the first user of the first data processing system that the second user is at the virtual lounge of the virtual room;
  receive an instruction from the first user of the first data processing system to allow or disallow the second user into the virtual room to establish a video call with the first user; and
  establish the video call between the first user and the second user if the first user allows the second user into the virtual room; and
the server, in a second configuration, configured to:
  allow the second user to access the virtual room from the virtual lounge without receiving an instruction from the first user of the first data processing system to establish the video call between the first user and the second user.

2. The system as claimed in claim 1, wherein the server is configured to receive a request, from a third user associated with the third data processing system, for establishing a secured connection between the third data processing system and the first data processing system when the first user is on a video call with the second user.

3. The system as claimed in claim 2, wherein the server is configured to:
  notify the first user that the third user is at the virtual lounge of the virtual room; and
  receive instructions from the first user to allow or disallow the third user into the virtual room.

4. The system as claimed in claim 3, wherein the server is configured to:
  receive an instruction from the first user to disconnect the video call between the first user and the second user and move the second user to the virtual lounge; and
  establish a video call between the first user and the third user if the first user allows the third user into the virtual room.

5. The system as claimed in claim 1, the second digital client is configured to display an indicator associated with the first user, wherein the indicator represents the availability of the first user to the second user when the second user enters the virtual lounge.

6. The system as claimed in claim 5, wherein the indicator represents one among the group of availability statuses including away, busy, do not disturb and available.

7. The system as claimed in claim 6, wherein the server is configured to:
receive an instruction from the second user to notify the second user once the indicator of the first user is switched to available.

8. The system as claimed in claim 1, wherein:
at least one of the first data processing system and the second data processing system is configured to share the visual content of the first digital client and the second digital client respectively with the corresponding data processing system.

9. The system as claimed in claim 1, wherein the server is configured to:
allow the users into the virtual lounge of the virtual room of the first user after establishing a secured connection; and
allow the users to communicate with other users securely connected to the virtual lounge of the virtual room of the first user.

10. The system as claimed in claim 9, wherein the server is configured to:
receive an instruction from the first user to display a blurry screen and a distorted audio of the video call between the first user and the second user in the virtual room to the users waiting in the virtual lounge of the virtual room of the first user.

11. The system as claimed in claim 9, wherein the server is configured to:
receive an instruction from the first user to display the name of the second user present in the video call in the virtual room to the users waiting in the virtual lounge of the virtual room.

12. The system as claimed in claim 9, wherein the server is configured to:
receive an instruction from the first user to allow all the users waiting in the virtual lounge into the virtual room of the first user.

13. The system as claimed in claim 1, wherein the server is configured to:
receive an instruction from the second user to transmit only the audio track of the video call to the first user; and
share the screen of the second data processing system with the first user when the second user enters the virtual room.

14. The system as claimed in claim 2, wherein the server is configured to:
receive an instruction from the third user to notify the third user once the video call between the first user and the second user is terminated; and
notify the third user once the video call between the first user and the second user is terminated.

15. The system as claimed in claim 1, the server is configured to:
receive an instruction from the first user to create a plurality of unique virtual sub-lounges for the virtual room; and
receive an instruction from the first user to assign the users' a privilege to access at least one virtual sub-lounge from the plurality of virtual sub-lounges.

* * * * *